United States Patent [19]
Buchwald

[11] 3,814,071
[45] June 4, 1974

[54] COOLANT TEMPERATURE RESPONSIVE EXHAUST CROSSOVER VALVE SYSTEM

[75] Inventor: Robert M. Buchwald, Birmingham, Mich.

[73] Assignee: General Motors Corporation, Detroit, Mich.

[22] Filed: Mar. 2, 1973

[21] Appl. No.: 337,416

[52] U.S. Cl... 123/122 H, 123/122 AB, 123/52 MV
[51] Int. Cl............................................ F02m 31/00
[58] Field of Search .. 123/122 H, 122 AA, 122 AB, 123/52 MV

[56] References Cited
UNITED STATES PATENTS

| 2,289,635 | 7/1942 | Edelen | 123/122 H |
|---|---|---|---|
| 2,819,025 | 1/1958 | Else | 123/122 H |
| 2,930,367 | 3/1960 | Kolbe | 123/122 H |
| 2,989,956 | 6/1961 | Drinkard | 123/122 H |
| 3,011,488 | 12/1961 | Toysel | 123/122 H |
| 3,019,781 | 2/1962 | Kolbe | 123/122 H |

*Primary Examiner*—Manuel A. Antonakas
*Assistant Examiner*—R. H. Lazarus
*Attorney, Agent, or Firm*—Peter D. Sachtjen

[57] ABSTRACT

Exhaust gas flow through an exhaust crossover passage in an internal combustion engine from the combustion chamber to the exhaust manifold is regulated by a pair of valves controlled by a thermosensitive motor responsive to engine coolant temperature. The valves divert the exhaust gases through the crossover passage during engine warmup for promoting greater vaporization of liquid fuel in the intake air-fuel mixture. As the engine coolant temperature rises, the valves are actuated in phase opposition by the motor to gradually close the crossover passage and open the passage to the exhaust manifold thereby thermally isolating the crossover passage when the engine reaches an operating temperature to prevent overheating of the intake air-fuel mixture.

2 Claims, 2 Drawing Figures

PATENTED JUN 4 1974 3,814,071

COOLANT TEMPERATURE RESPONSIVE EXHAUST CROSSOVER VALVE SYSTEM

The present invention relates to internal combustion and, in particular, to a valve system for controlling the flow of exhaust gases through an exhaust crossover passage.

Current internal combustion engines are provided with an exhaust crossover passage which is in heat exchange relation with the induction passage of the intake manifold. A heat exchanger separating the two passages is rapidly heated by the exhaust gases to promote vaporization of liquid fuel impinging thereon during engine warmup. After the engine reaches an operating temperature, fuel vaporization is provided in the intake passages and the heat exchange from the exhaust gases is not necessary. Preferably the heat exchanger should not significantly heat the entering air-fuel mixture to avoid decreasing the volumetric efficiency of the engine.

The present invention provides a valves control system for the exhaust crossover flow which isolates the heat exchanger from exhaust gas flow when the engine reaches a predetermined temperature. The system incorporates two ceramic valves actuated in phase opposition by a thermosensitive motor operatively disposed in the engine coolant supply. One of the valves is located in the crossover passage upstream of the heat exchanger and is normally open at engine startup. The other valve is disposed in the direct exhaust passage to the exhaust manifold and is normally closed at engine startup. The valves are connected to the motor by a pair of control cables. A rise in coolant temperature creates a proportional output in the motor which transmitted through the cables to the valves. This causes the crossover passage valve to gradually close and the exhaust passage valve to gradually open. At a predetermined temperature, the crossover valve is completely closed thereby thermally isolating the heat exchanger from the exhaust gases and preventing undue heating of the entering air-fuel mixture. The exhaust passage valve is fully open for direct routing of the exhaust gases to the exhaust manifold. The engine coolant supply is an effective gauge of engine operating temperature. The motor output is correlated to the temperature rise of the coolant so as to completely close the crossover valve within two minutes of engine startup.

These and other features of the present invention will be apparent to one skilled in the art upon reading the following detailed description, references being made to the accompanying drawings showing a preferred embodiment in which.

Figure 1:
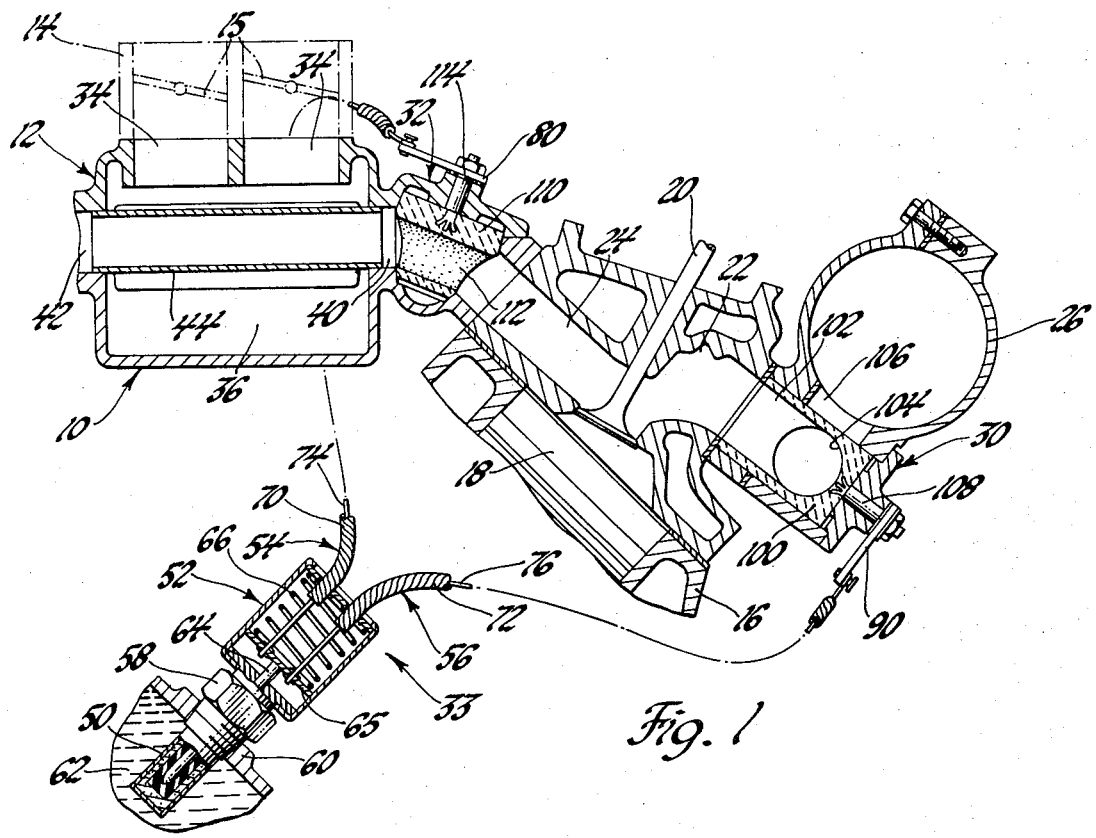
FIG. 1 is a fragmentary cross sectional view of an internal combustion engine having a coolant temperature responsive exhaust crossover valve system made in accordance with the present invention showing the valves in the engine warning mode for routing exhaust gases through the crossover passage.
Figure 2:
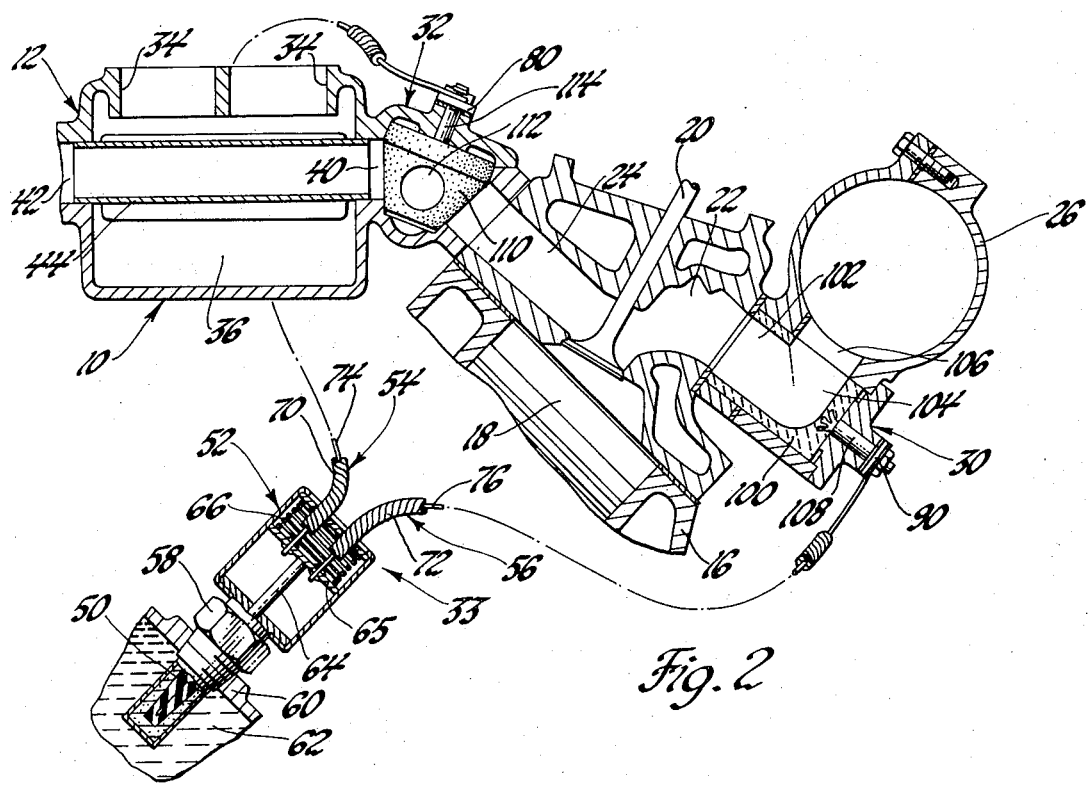
FIG. 2 is a view similar to FIG. 1 showing the valves in the engine operating mode for routing exhaust gases directly to the exhaust manifold.

Referring to FIGS. 1 and 2, there is shown an internal combustion engine 10 having an intake manifold 12 on which there is mounted a carburetor 14 having throttle valves 15. The throttle valves 15 of the carburetor 14 conventionally controls the delivery of mixture of fuel and air to the intake manifold for routing through induction passages to a cylinder bank 16 including a combustion chamber 18. The mixture is combusted in the chamber 18 and the flow of exhaust gases therefrom is controlled by a conventionally actuated exhaust valve 20 for routing to an exhaust passage 22 and/or an exhaust crossover passage 24. As illustrated, only a single cylinder bank is shown. However, for the illustrated V-type engine an opposed cylinder bank on the other side of the engine has similar components. The exhaust passage 22 is fluidly connected to an exhaust manifold 26 mounted on the outboard side of the cylinder bank 16. The flow of exhaust gases through the exhaust passage 22 is controlled by an exhaust passage diverter valve 30. The flow of exhaust gases through the crossover passage 24 is controlled by a crossover diverter valve 32. The operation of the valves 30, 32 is controlled by a coolant temperature responsive valve actuating mechanism 33.

The intake manifold 12 includes a pair of riser bores 34 communicating with the throats of the carburetor and discharging at a plenum 36. The entering mixture of fuel and air delivered to the plenum 36 is routed to individual cylinders by runner passages not shown. The intake manifold 12 includes laterally spaced crossover passage bores 40 42. On either side of the plenum 36 the bore 40 fluidly communicates downstream of the crossover valve 32 and discharges at the plenum 36. The bore 42 has an inlet at the plenum 36 and discharges to the exhaust manifold on the other side of the engine. However, it may also discharge to the exhaust manifold 26 at a point downstream of the exhaust passage 22.

A thin wall metallic tubular heat exchanger 44 is disposed in the plenum 36 and has its end retained in the bores 40 and 42. Exhaust flow through the crossover passage 24 and the heat exchanger 44 rapidly raises the temperature of the latter. During engine warmup, the liquid droplets in the entering air-fuel mixture impinged upon the surface of the heat exchanger 44 and are vaporized thereby. However, as the engine warms up the heat needed at the heat exchanger 44 becomes less as the intake manifold rises in operating temperature. It is also undesirable to continue heating of the heat exchanger 44 when the engine reaches its operating temperature inasmuch as the resultant heating of the intake mixture adversely affects the volumetric efficiency of the engine.

The valve actuating mechanism 33 directs exhaust gases through the heat exchanger 44 during engine warmup gradually decreases the flow rate through the heat exchanger as the engine temperature rises for eventual direct flow to the exhaust manifold 26 when the engine reaches a predetermined operating temperature. More particularly, the valves 32 and 30 are operated in phase opposition by a thermal-sensitive wax pellet motor 50 coupled to a cable control mechanism 52. The cable control mechanism 52 operates a first control cable 54 operatively connected to the valve 32 and a second control cable 56 operatively connected to the valve 30.

The motor 50 is a conventional wax pellet type which uses an expansible wax contained in the motor casing to extend an output member as a function of temperature. The motor 50 is disposed in a plug 58 which is threaded into a boss 60 on the engine and registers with the engine coolant supply 62. A convenient location for the motor 50 would be at the water pump crossover body near the thermostat. This enables the motor to immediately sense changes in coolant temperature as engine warmup. As is conventional, the motor 50 converts temperature changes into mechanical motion by extending the output piston 64. The piston 64 is connected to a cable control plate 65 disposed interior of the cable control mechanism 52. One end of each of the cables 54 and 56 is attached to the plate 54. A helical coil compression spring 66 retained between the upper surface of mechanism 52 and the control plate 65 biases the latter and the output piston 64 to the retracted position. As shown in FIG. 2 wherein the engine coolant supply is, at the engine operating temperature the output piston 64 of the motor 50 is extended thereby upwardly shifting the control plate 65 and the ends of the cables 54, 56 and compressing the spring 66.

To control cables 54, 56 each respectively comprise flexible exterior sheaths 70, 72 and control wires 74 and 76. The upper end of the control cable 54 is attached to a valve lever 80 at the crossover valve 32. The upper end of the control cable 56 is attached to a valve lever 90 at the exhaust passage valve 30.

The exhaust passage valve 30 comprises a cylindrical ceramic valve member 100 which is rotatably supported in a cylindrical bore integral with the exhaust manifold 26. The valve member 100 includes an axial passage 102 and a radial passage 104. In the normally closed position at engine starting, the axis of the passage 104 is normal to the axis of the passage 106 communicating with the exhaust manifold 26. In the open position as shown in FIG. 2, the axis of the passage 104 is aligned with the passage 106 whereby free exhaust gas flow is permitted directly from the combustion chamber 18 through the passage 22, the valve passages 102, 104 to the exhaust manifold 26. The valve body 100 is interconnected with the valve lever 90 by a shaft 108.

The crossover valve 32 comprises a generally conical valve body 110 rotatably supported in a valve housing adjacent the bore 40. The valve body 110 includes a diametrically extending circular passage 112. A shaft 114 interconnects the valve body 110 with the valve lever 80. The valve 30 is normally opened at engine startup and the passage 112 is axially aligned with the crossover passage 24. In operation, when the engine coolant supply is below a predetermined temperature the motor 50 will assume position shown in FIG. 1 wherein the output piston is retracted and the cables position the valves 32 and 30 to the normally open and normally closed positions respectively. In this engine warmup mode flow of exhaust gases from the combustion chamber 18 will be blocked by the valve 30 and all exhaust gases will flow through the crossover passage 24, the valve passage 112 and the heat exchanger 44 for exhausting at the opposed exhaust manifold. This will rapidly heat the heat exchangers 44 and the liquid fuel impinging upon thereon will be vaporized. As the temperature of the coolant supply rises, the output piston 64 will extend thereby upwardly shifting the control plate 65 compressing the spring 64 and the cable wires 74 and 76. This will cause the valve body 110 to be rotated gradually by the shaft 114 to gradually block the passage 112 to the heat exchanger 44 thereby reducing the flow of gases therethrough. Concurrently and in phase opposition therewith, the valve body 100 will be rotated counterclockwise by the shaft 108 to gradually assume an open position permitting the flow of exhaust gases directly to the exhaust manifold 26.

The net effect of the valve operation will be to reduce the heat transfer at the heat exchanger 44. Inasmuch as the surfaces of the induction passages of the manifold are rising in temperature in accordance with the rise in temperature of the coolant supply, they will contribute to the vaporization of the fuel and the full thermal capacity of the heat exchanger will not be needed. When the engine coolant supply reaches a predetermined temperature the valves will be in the engine operating mode with the valve 32 fully closed as shown in FIG. 2 and the valve 30 fully open. This blocks the flow of exhaust gases through the heat exchanger 44 such that the latter is thermally isolated and does not serve to raise the temperature of the entering air-fuel mixture so as to adversely affect the volumetric efficiency of the engine.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In an internal combustion engine having a coolant supply, an induction passage for conveying an air and fuel mixture to a combustion chamber, first and second exhaust passages fluidly connecting the combustion chamber to an exhaust manifold, and a heat exchanger disposed between said first exhaust passage and said induction passage, said heat exchanger being heated by the exhaust gases flowing through said first exhaust passage for vaporizing liquid fuel in said mixture impinging thereon, a valve system for controlling the flow of exhaust gases from said combustion chamber through said exhaust passages comprising: a first valve member disposed in said first exhaust passage movable between an open position and a closed position; a second valve member in said second exhaust passage movable between a closed position and an open position; thermal actuator means in heat exchange relationship with the engine coolant supply and having output means movable in accordance with the temperature changes of the coolant supply; first control means interconnecting said first valve member with said output means, said first control means adapted to move said first valve member from said open position to said closed position upon a rise in coolant temperature; second control means interconnecting said second valve member with said output means, said second control means adapted to move said second valve member from said closed position to said open position upon a rise in coolant temperature whereby exhaust gases are directed through said first exhaust passage during engine warmup and gradually reduced in the flow rate by said first valve until a predetermined temperature rise at which time said second valve is fully opened and said first valve fully closed thereby routing the exhaust gases directly to said exhaust manifold.

2. In an internal combustion engine, a coolant supply, an induction passage for conveying an air and fuel mixture to a combustion chamber, an exhaust passage leading from the combustion chamber to an exhaust manifold for conveying exhaust gases along a first path, an exhaust gas crossover passage leading from the combustion chamber to the exhaust manifold for conveying exhaust gases along a second path, a heat exchanger disposed between said crossover passage and said induction passage, said heat exchanger being heated by exhaust gases in said second path for vaporizing liquid portions of said mixture, a normally closed valve in said exhaust passage, a normally open valve in said crossover passage, a thermal actuator in heat exchange relationship with said coolant supply, said actuator having an output piston movable in accordance with the temperature change in said coolant supply; control cables connecting said valves to said output piston for operating said valves in phase opposition whereby exhaust gases are directed through said crossover passage along said second path during engine warmup, the flow of exhaust gases being gradually reduced as the coolant supply temperature increases by the closing of said first valve and the opposed opening of the second valve until the coolant supply reaches a predetermined temperature whereat said second valve is fully opened and said first valve is fully closed thereby routing the exhaust gases directly to said exhaust manifold along said first path.

* * * * *